Patented Jan. 22, 1952

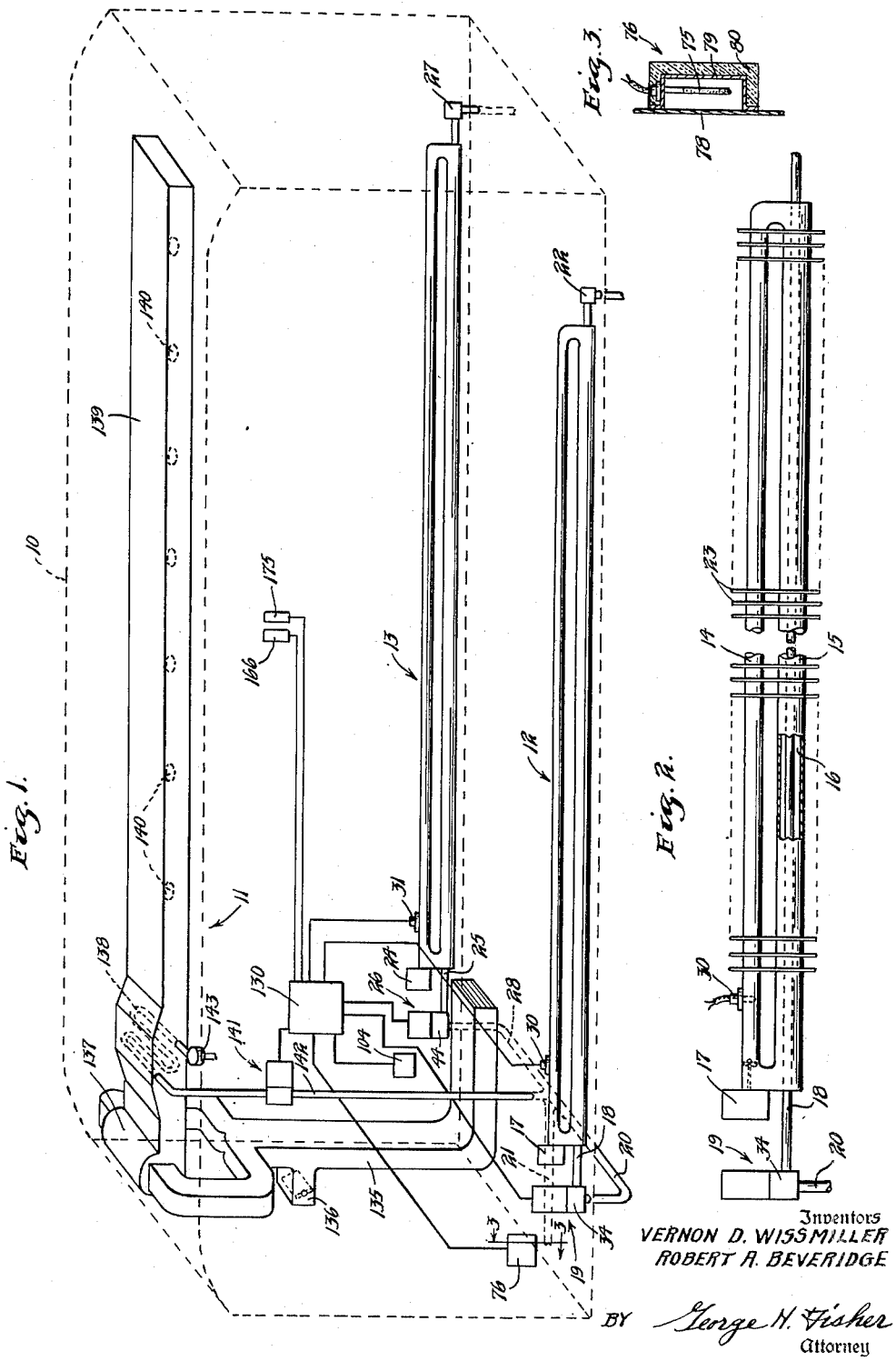

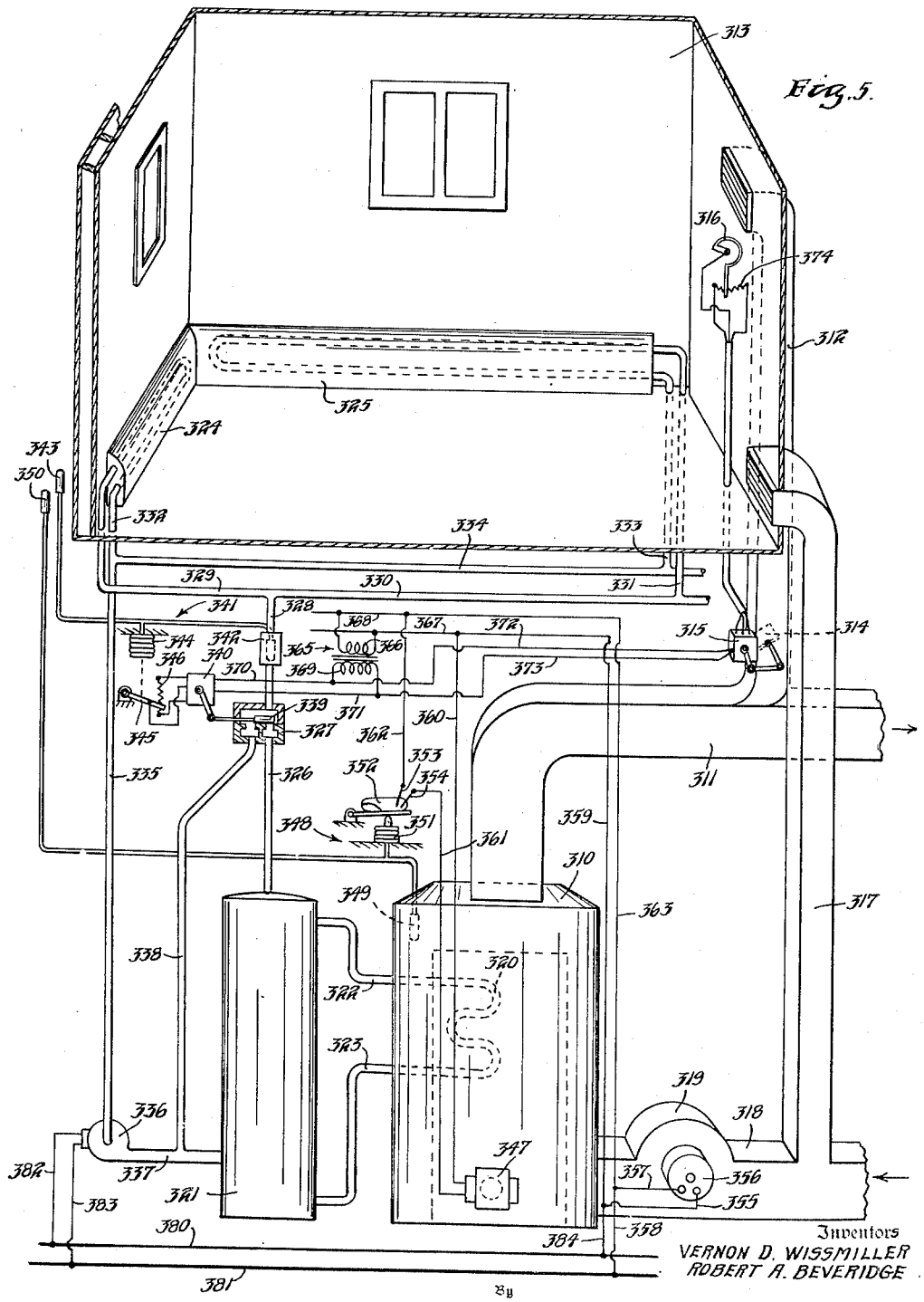

2,583,524

UNITED STATES PATENT OFFICE 2,583,524

HEATING SYSTEM CONTROL APPARATUS

Vernon D. Wissmiller, Chicago, Ill., and Robert A. Beveridge, Minneapolis, Minn., assignors to Minneapolis-Honeywell Regulator Company, Minneapolis, Minn., a corporation of Delaware Application September 19, 1946, Serial No. 698,014

6 Claims. (Cl. 237—5)

1

The present invention relates to an improved air-conditioning and heating system especially adapted for railway cars, residences and the like.

It is well known that controlling the temperature of a space to a fixed value does not necessarily result in a uniform feeling of comfort to an occupant of the space as outside temperatures vary. For instance, a particular temperature value for the space in mild weather may seem too high for comfort, whereas, during very cold weather, the same temperature value may seem too low. It appears that one of the principal factors responsible for this condition is the temperature of the wall surfaces surrounding said space. Previous attempts to solve the problem by panel heating systems or by compensated temperature control systems have been only partially satisfactory.

The problem of maintaining uniform conditions of comfort is particularly troublesome in railway cars because of the considerable variation in the temperature and sun conditions affecting said cars. Changes in their direction of travel, speed of travel, changes in sun condition due to tunnels, deep ravines and the like, and other changes affecting the heating load, all have an appreciable effect on the maintenance of comfort within the cars. In addition to these factors, the problem is further complicated by the seating arrangements wherein some of the people sit much closer to the outer walls than other people and hence are more affected by wall temperature conditions.

It is therefore a principal object of this invention to provide a heating system and means for controlling the same for maintaining uniform conditions of comfort under widely varying conditions.

It is also an object to provide a heating system and control means therefor for a walled space wherein the effects of varying air motion on the outer walls and variations in sun effects are made factors in the control of the said heating system.

It is a further object to provide means for controlling the temperature of a space wherein means are provided for controlling the temperature of at least a portion of the walls of said space and other means are provided for satisfying the major portion of the temperature changing demands of the said space.

It is an additional object to provide means for controlling temperature in a space comprising radiant temperature changing means for at least a portion of the walls of said space and to provide a circulating tempered medium having sufficient temperature changing ability to meet the principal portion of the demand of the said space.

It is also an object to provide means for controlling the temperature of a space wherein the temperature of a fluid medium circulating through radiant temperature changing means in said space is inversely varied relative to outdoor temperature and wherein the temperature changing effect of a forced air temperature changing apparatus for said space is controlled in response to the temperature of said space.

It is a somewhat similar object to provide means for controlling the temperature of a space wherein the temperature of a fluid medium circulating through radiant temperature changing means in said space is inversely varied relative to the temperature of the outer wall of said space and wherein other temperature changing means carries the major portion of the temperature changing load.

It is a further object to provide a temperature changing system wherein one portion of the system has a relatively large thermal capacity but is capable of satisfying a relatively small portion of the temperature changing demands whereas the other portion of the system which is capable of satisfying the most of the temperature changing demand is characterized by a relatively low thermal capacity.

It is an additional object to provide a heating system for a railway car wherein floor heat means extending along each side of the car are individually controlled so that the temperature of each of said floor heat means is varied inversely with the outer wall or outside air temperature on the respective side of the car and wherein the major portion of the heat needed is supplied by the overhead portion of the system.

It is a further object to provide floor heat means for a railway car in which a suitable liquid is circulated through a closed loop heat exchanger, the liquid being heated by steam supplied to conduit means in heat exchange relation with said liquid, the steam supply being adjusted to maintain the liquid at a temperature inversely variable with outdoor or outer wall temperature.

It is also an object to provide floor heat means for a railway car in which a closed loop heat exchanger is arranged with the principal portions of the loop adjacent and extending horizontally and which contains a suitable liquid positively circulated by pump means and which liquid is heated by a steam supplied conduit in heat exchange relation with said liquid.

It is a further object to provide floor heat means for a railway car or the like comprising a circulating liquid where the temperature of said liquid is varied inversely with the outdoor temperature.

It is an additional object to control heat radiating means in a railway car in a manner to compensate for changes in heat load due to variations in the speed of travel of the car.

It is also an object to individually control heat radiating means in a railway car in a manner to compensate for sun effects on the respective sides of the car.

These and other objects will become clear upon a study of the following specification and drawing wherein:

Figure 1 is a schematic illustration of the present apparatus installed in a railway car.

Figure 2 is an enlarged elevation view with parts in section showing a floor heat means.

Figure 3 is a sectional elevation of a skin temperature responsive device taken on the line 3—3 in Figure 1.

Figure 5 is a modification showing schematically the present system applied to a residential building.

Figure 4:
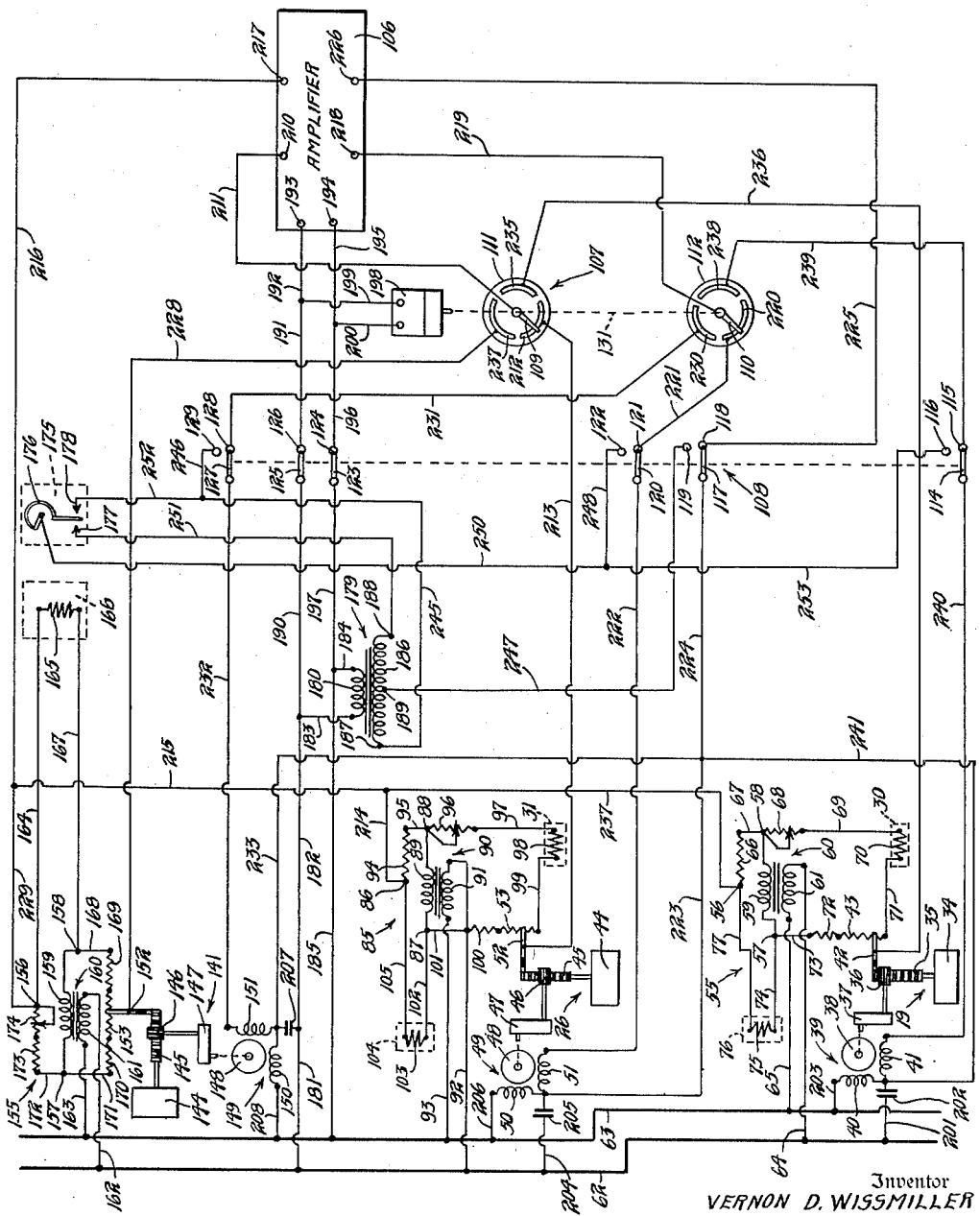
Figure 4 is a schematic wiring diagram showing how the apparatus of Figure 1 is connected.

Referring to Figure 1, where the present apparatus is shown installed in a railway car 10, it is noted that the apparatus includes an overhead heating system indicated generally as 11, and floor heat means 12 and 13. Floor heat means 12 and 13 extend substantially the length of the car, or at least the length of the passenger space, and are arranged adjacent the side walls of the car and near the floor, as shown.

As best shown in Figure 2, floor heat means 12 includes horizontal conduit means 14 and 15 connected at their ends to form a closed loop. A suitable heat exchange liquid 16, such as a mixture of water and ethylene glycol, is circulated through the said loop by a conventional motor driven circulator 17, preferably arranged in conduit 14. Any suitable expansion means, such as a closed tank, expansible bellows, or the like, not shown, may be provided for each of the floor heat means to accommodate the expansion of the liquid when it is heated. Liquid 16 is heated by a steam pipe 18 extending through lower conduit 15, the said pipe 18 being connected through motorized valve 19 and pipe 20 to the train steam line 21. The condensate formed in pipe 18 is discharged through a conventional steam trap 22 (Figure 1). To increase the effective radiating area of floor heat means 12, fins 23 may be secured to conduits 14 and 15 in any suitable fashion. For a purpose which will appear, a temperature responsive bulb or device 30 including a thermistor 70 is inserted into conduit 14 or attached to the said conduit, for responding to the temperature of liquid 16. A thermistor is a temperature responsive resistor and comprises, in the present instance, a winding of nickel wire or other material having similar characteristics. The winding of bulb 30, or thermistor 70, forms part of a resistance bridge circuit, to be described.

Although only floor heat means 12 has been described in detail, it is noted that floor heat means 13 is identical with 12 and includes a circulator 24, a steam pipe 25, a motorized valve 26, a steam trap 27, and a thermistor bulb or device 31. Valve means 26 controls the flow of steam from the train steam line 21 through pipe 28 and pipe 25 in the same manner as previously described. The components of floor heat means 13 are the same as those of floor heat means 12, but have been given different numbers to minimize confusion as the description proceeds.

Motor driven valve means 19, referring to Figure 4, comprises a conventional throttle valve means 34 having a reciprocable stem including a rack 35 adjusted by pinion 36. Pinion 36 is driven through gear train 37 by armature 38 of reversible two-phase motor means 39. Motor means 39 also includes a fixed phase stator winding 40 and an amplifier phase stator winding 41 arranged 90 electrical degrees apart. In addition to adjusting valve 34, rack 35 also adjusts wiper 42 along potentiometer resistor 43.

Motor driven valve means 26 is similar to 19 and includes throttle valve means 44 having a reciprocable stem including a rack 45 adjusted by pinion 46. Pinion 46 is driven through gear train 47 by armature 48 of reversible two-phase motor means 49. Motor means 49 likewise includes a fixed phase stator winding 50 and an amplifier phase stator winding 51 arranged as above described. Rack 45, in addition to adjusting valve 44, also adjusts wiper 52 along potentiometer resistor 53.

Wiper 42 forms one output terminal of a resistance bridge network 55, terminal 56 being the other output terminal of the said network. Network input terminals 57 and 58 are energized by secondary winding 59 of transformer 60. Primary winding 61 of the transformer 60 is energized from line wires 62 and 63 by wires 64 and 65, respectively. The network circuit 55 comprises, reading from output terminal 56 in a clockwise direction: fixed resistor 66, wire 67, input terminal 58, adjustable resistor 68, wire 69, thermistor 70 of device 30, wire 71, the portion of resistor 43 below wiper 42, output terminal (wiper) 42, the portion of resistor 43 above wiper 42, fixed resistor 72, wire 73, input terminal 57, wire 74, thermistor 75 of wall temperature responsive means 76, wire 77 and output terminal 56.

Wall temperature responsive means 76, shown in section in Figure 3, includes a thermistor 75, having a winding of suitable material such as nickel, held adjacent inner side of the outer skin or wall 78 of car 10 by an open side box means 79. Heat insulation 80 is arranged around box 79 to assure that thermistor 75 is affected only by the temperature of wall 78. If desired, thermistor 75 may be located on the outer side of wall 78 so that it can respond to the outside air temperature. When located on the outside of wall 78, means to protect the thermistor 75 from sun and wind effects may or may not be used depending upon the particular installation.

Wiper 52 forms one output terminal for a similar resistance bridge network 85, 86 being the other output terminal of the said network. Input terminals 87 and 88 are energized by secondary winding 89 of transformer 90, primary winding 91 of the transformer 90 being energized from line wires 62 and 63 by wires 92 and 93, respectively. The network circuit 85, reading clockwise from terminal 86, includes: fixed resistor 94, wire 95, input terminal 88, adjustable resistor 96, wire 97, thermistor 98 of temperature responsive device 31, wire 99, the portion of resistor 53 below wiper 52, output terminal (wiper) 52, the portion of resistor 53 above wiper 52, fixed resistor 100, wire 101, input terminal 87, wire 102, thermistor 103 of wall temperature responsive device 104, wire 105 and output terminal 86. Controller 104 is similar to 76 shown in Figure 3 but obviously is used on the opposite wall of the car.

The output terminal of networks 55 and 85 are sequentially connected in controlling relation to a suitable amplifier 106 by a sequence switch 107, the output terminals of the amplifier being simultaneously connected to the amplifier phase stator windings of motors 39 and 49, respectively, providing manual switch 108 is adjusted for automatic operation, as shown.

Amplifier means 106 is of any conventional sort which maintains a predetermined phase relation between its input signals and its output current. As an example of an amplifier that has the desired characteristics, reference is made to that disclosed in Patent No. 2,423,534 granted to Albert P. Upton on July 8, 1947.

Sequence switch 107 comprises a geared electric motor 198 having a shaft 131 on which are mounted switch blades 109 and 110 for rotation over switch banks 111 and 112, respectively, the speed of rotation of the blades being preferably about 2 R. P. M.

Manual switch 108 includes blade 114, coacting with contacts 115 and 116; blade 117, coacting with contacts 118 and 119; blade 120, coacting with contacts 121 and 122; blade 123, coacting with contact 124; blade 125, coacting with contact 126; and blade 127 coacting with contacts 128 and 129. Blades 114, 117, 120, 123, 125 and 127 are suitably secured together for simultaneous operation. While this switch is shown as being manually operated, it is contemplated that it may be operated by a pressure responsive device connected to the train's air line, by a thermostatic device, or by other suitable means.

In practice, amplifier 106, sequence switch 107, manual switch 108 and certain of the bridge network components are conveniently located in a suitable control panel and terminal box 130, shown in Figure 1.

Overhead heating means 11 comprises a forced air system including a return air duct 135, a fresh air inlet 136 for said duct, a motor driven blower 137, a steam heat-exchanger coil 138, a discharge duct 139, and air outlets 140 for distributing the air from said duct 139 into the car. Motor driven blower means 137, although controllable in any desired manner, is preferably controlled from a switch, not shown, operated in conjunction with switch 108. Steam coil 138 receives steam through a motor actuated modulating valve means 141, similar to valve means 19 and 26, and pipe 142 from the train steam line 21. The condensate from the coil is discharged through a conventional trap means 143.

Motor driven valve means 141, similar to valve means 19 and 26, comprises a throttle valve portion 144 (Figure 4) having a reciprocable stem including a rack 145 operated by a pinion 146. Pinion 146 is driven through gear train 147 by armature 148 of motor means 149. Motor means 149 includes a fixed phase stator winding 150 and an amplifier phase stator winding 151. In addition to adjusting valve 144, rack 145 also adjusts wiper 152 along resistor 153. Wiper 152 forms an output terminal of a resistance bridge network circuit 155 of which resistor 153 is a part. The other output terminal of the network 155 is numbered 156. The input terminals 157 and 158 of the network are energized from secondary winding 159 of transformer 160. Primary winding 161 of the said transformer is connected to line wires 62 and 63 by wires 162 and 163, respectively. The network circuit, reading clockwise from output terminal 156 includes: wire 164, thermistor 165 of space thermostat 166, wire 167, input terminal 158, wire 168, fixed resistor 169, the portion of resistor 153 to the right of wiper 152, output terminal (wiper) 152, the portion of resistor 153 to the left of wiper 152, fixed resistor 170, wire 171, input terminal 157, wire 172, fixed resistor 173, and adjustable resistor means 174 back to output terminal 156. Network circuit 155 is connected into controlling relation with amplifier 106 by sequence switch 107 in the same manner as the aforementioned network circuits and the amplifier is likewise connected into controlling relation to motor driven valve means 141 as before. Space thermostat 166 is preferably of the resistance type and includes a thermistor comprising a winding of nickel wire or the like.

In addition to space temperature responsive means 166, a more conventional thermostat 175 including a bimetal 176 and stationary contacts 177 and 178 is provided for controlling the floor heat means to maintain a predetermined relatively low temperature in the car when the manual switch 108 is shifted to its other position for standby operation. Thermostat 175 operates in conjunction with a phase shifting transformer 179 to directly control motor means 39 and 49 without use of amplifier 106. Phase shifting transformer 179 comprises a primary winding 180 energized by the circuit: line wire 62, wire 181, wire 182, wire 183, winding 180, wire 184, and wire 185 back to line wire 63. Secondary winding 186 of transformer 179 includes terminal connections 187 and 188 and a center tap 189.

As before noted, the present apparatus is rather specifically described but it should be kept in mind that this disclosure is intended to be illustrative only and many substitutions and equivalents are readily observed. In the following disclosure of operation, the function of the present apparatus will be set forth and the description thereby made more clear.

*Operation*

With the present apparatus put in operation by the energizing of line wires 62 and 63, it is noted that bridge networks 55, 85 and 155 are energized by circuits previously traced. Likewise, phase shifting transformer 179 is also energized by a circuit just described. In addition, with manual switch 108 in the position shown, it is noted that amplifier 106 is energized by the following circuit: line wire 62, wire 181, wire 182, wire 190, switch blade 125, contact 126, wire 191, wire 192, terminal 193 of amplifier 106, terminal 194 of the amplifier, wire 195, wire 196, switch contact 124, switch blade 123, wire 197, and wire 185 back to line wire 63. Motor means 198 of sequence switch 107 is connected in parallel with amplifier 106 by wires 199 and 200.

Fixed phase winding 40 of motor means 39 is energized by the circuit: line wire 62, wire 201, capacitor 202, winding 40, wire 203 and line wire 63. Likewise, fixed phase winding 50 of motor means 49 is energized by the circuit: line wire 62, wire 204, capacitor 205, winding 50, wire 206 and line wire 63. Fixed phase winding 150 of motor means 149 is energized by the circuit: line wire 62, wire 181, capacitor 207, winding 150, wire 208 and line wire 63.

With the present control apparatus thus energized, and assuming that there is steam available from the train steam line 21, and further assuming that the present railway car is attached to a train being operated on a sunny day with an outside temperature of approximately 40°, for instance.

Further, as an incident to operation of switch 108 or by other suitable means, motor driven blower means 137 is placed in operation and circulators 17 and 24 are energized by suitable circuits, not shown.

An inspection of Figure 4 will show that network circuit 85 is in control of amplifier 106 by the circuit: input terminal 210 of amplifier 106, wire 211, blade 109 of switch bank 111, switch sector 212, wire 213, wiper 52, network 85, output terminal 86, wire 214, wire 215, wire 216, and input terminal 217 of the said amplifier. Likewise, amplifier 106 is connected to the amplifier phase winding 51 of motor means 49 by the circuit: output terminal 218 of amplifier 106, wire 219, blade 110 of switch bank 112, switch sector 220, wire 221, switch contact 121, switch blade 120, wire 222, winding 51, wire 223, wire 224, switch blade 117, contact 118, wire 225 and output terminal 226 of the said amplifier.

Now assume that network 85 has been adjusted by resistor 96 so that a temperature at 104 of −30° requires a temperature at 31 of 130° for balance of the network, and at an outdoor temperature of 70° at 104, a temperature of 80° is required at 31 for balance. Thus, there should be a 1° change in water temperature for each 2° change outside to keep the network in balance, this generally being arranged by using twice as much wire in thermistor 98 of device 31 as is used in thermistor 103 of controller 104. Then, assuming that the outdoor temperature is +40°, the liquid temperature in floor heat means 13 to which device 31 responds should be 95°. With this temperature at 31 and under the conditions stated, network 85 is balanced and has no output current, therefore there is no signal to the amplifier. From this it follows that there is no effective output current from the said amplifier, hence winding 51 of motor means 49 is not operatively energized and motor means 49 does not operate.

However, further inspection of Figure 4 will indicate that throttle valve 44 is approximately half open and steam is being supplied to floor heat means 13 to increase the temperature of the same. With the temperature of floor heat means 13 rising, assume that it now rises above 95°. A rise in temperature at 31, resulting in increased resistance of thermistor 98, unbalances the network and results in a signal being imposed on amplifier 106 by the circuit previously traced. As this network is energized by alternating current, and an unbalance of a network so energized results in a signal of one phase or another depending upon which way the network is unbalanced, it now appears that the present unbalance will result in a signal of a phase which will cause amplifier 106 to energize amplifier winding 51 in a manner to drive armature 48 in a direction to move rack 45 and wiper 52 downwardly to restore the balance of the network. It is obvious that this is the correct direction of movement, for an increased resistance at 98 requires a lowered resistance on the bottom portion of resistor 53 and an increased resistance on the upper portion of resistance 53 to rebalance the network. However, it will be noted that downward movement of rack 45 results in a throttling of valve 44 and thus results in a lower delivery of steam to floor heat means 13. This is the correction that is desired because the rising temperature of floor heat means 13 can be corrected only by decreasing the amount of steam supplied to the said floor heat means. With sequence switch 107 rotating at 2 R. P. M., it is noted that switch blade 109 will remain on sector 212 for approximately ten seconds. If the desired correction can be made in ten seconds, for instance, valve 44 will be properly positioned and the network rebalanced in that time. However, if the correction is not completed within that time the correction will be continued at the next revolution of the said switch.

While it is obvious that an increase in resistance at 98 due to an increase in temperature at 31 unbalances the network 85 in a manner to cause closure of valve 44, it is equally obvious that a temperature too low at 31, causing a low resistance of 98 will unbalance the network in an opposite direction and thereby require an opposite movement of rack 45 and wiper 52 to rebalance the network. This, of course, results in more steam being added to raise the temperature of the floor heat means. It also follows that a decrease in resistance of 103 will unbalance the network in the same manner, although to a lesser extent, as an increase in temperature and resistance of 98. Thus, if the outside temperature should drop to 10°, for instance, the resistance of 103 becomes low, a signal is imposed on amplifier 106, due to the unbalance of the network, which will be of the same phase as that caused by a low resistance of 98, thereby causing operation of motor means 49 in a direction to open valve 44 and increase the temperature of 98. In other words, it can be assumed that thermistor 98 is a controlling resistor for the network and thermistor 103 establishes a control point for the network depending upon outdoor temperature.

Assuming that sequence switch 107 is rotating clockwise, when blades 109 and 110 move from sectors 212 and 220 to the next clockwise sectors, network 155 is placed in charge of amplifier 106 by the circuit: input terminal 210 of the said amplifier, wire 211, switch blade 109, switch sector 237, wire 228, wiper and output terminal 152, network 155, output terminal 156, wire 229, wire 216 and input terminal 217 of the said amplifier. Likewise, the amplifier 106 is placed in charge of amplifier winding 151 of motor means 149 by the circuit: output terminal 218 of the said amplifier, wire 219, blade 110, switch sector 230, wire 231, contact 128, switch blade 127, wire 232, winding 151, wire 233, wire 224, switch blade 117, switch contact 118, wire 225, and amplifier terminal 226. With the overhead heating system now being controlled, it is noted that valve 144 is partly open, heat is being supplied to the air being delivered through duct 139 and outlets 140 and, if device 166 is at the temperature desired, network 155 will be balanced. However, if the temperature at 166 should be lower than that desired, or if a new and higher control point should be selected by adjusting resistor 174, then the network 155 becomes unbalanced due to the relatively low resistance in the upper right-hand branch of the same. This causes a signal to be impressed on amplifier 106 by the circuit previously traced and of a phase causing the output current from the amplifier to operate motor means 149 in a direction to drive rack 145 and wiper 152 to the right. Moving wiper 152 to the right across resistor 153 acts to restore the balance of the network and causes further opening of the valve 144 resulting in the delivery of more heat to the space as called for by the low temperature at device 166. From this it follows that a higher resistance of 165, due to a relatively high temperature affecting device 166, will cause the network 155 to become unbalanced in an opposite direction, a signal of opposite phase will be imposed on amplifier 106 and the output current of amplifier 106 of an opposite phase will cause operation of motor means 149 in a reverse direction. This will cause movement of rack 145 and wiper 152 to the left and result in a closing of valve 144 and a limiting of the heat supplied by the overhead heating means.

A further rotation of sequence switch 107 in a clockwise direction places network 55 in control of amplifier 56 by the circuit: input terminal 210 of amplifier 106, wire 211, switch blade 109, switch sector 235, wire 236, wiper (output terminal) 42, network 55, output terminal 56, wire 237, wire 215, wire 216, and input terminal 217 of the amplifier 106. In addition, the amplifier is in control of winding 41 of motor means 39 by the circuit: output terminal 218, wire 219, switch blade 110, switch sector 238, wire 239, contact 115, switch blade 114, wire 240, winding 41, wire 241, wire 224, switch blade 117, contact 118, wire 225, and output terminal 226 of amplifier 106. Assuming that network 55 is adjusted similarly to network 85, and that the same temperatures are required at devices 76 and 30 for balance of this network as were required at devices 104 and 31 of network 85, it will now be noted that valve means 34 is substantially closed. This indicates either a high temperature at device 30 or a high temperature at device 76.

Assuming that the network 55 became balanced in the position shown due to a high temperature at 76 which was due to the near side of the car being exposed to sunshine and thereby warming the wall above the temperature of the opposite wall, then it follows that when the sun is obscured for some time and the wall temperature affecting device 76 decreases, the said network will become unbalanced and impose a signal on amplifier 106 by a circuit previously traced of a sort to cause rotation of motor means 39 in a direction to open valve 34 and increase the temperature of floor heat means 12. Thus, before the cooling of wall 78 can have an effect on the passengers seated inside the car and along that side, the operating temperature of floor heat means 12 is increased to offset the drop in temperature of the wall and thereby maintain a uniform resultant temperature of the inner wall of the car. It is thus obvious that changes in temperature at device 30 affecting the resistance of thermistor 70 will cause signals to be imposed on amplifier 106 which will result in operation of valve means 19 to increase or decrease the temperature of floor heat means 12 as required and as determined by the temperature detected by device 76.

Because of the relatively low temperatures maintained by floor heat means 12 and 13, the total amount of heat they add to the car is only a minor portion of the total amount needed, most of the heat being furnished by the overhead system. However, due to the floor heat means being modulated to keep the wall and floor area comfortably warm, persons sitting adjacent the wall, as well as those next to the aisle, will be comfortable with a predetermined air temperature in the car. Further, as this comfortable feeling due to the warmed walls is maintained regardless of variations in outside temperature, a uniform space temperature may be maintained under all normal heating conditions. This makes for ease of control and satisfaction to the passengers. Further, since each floor heat means is controlled by its individual network, variations in sun effects, wind effects, train speed and the like are compensated in the same manner as variations in temperature, due to sun tending to add to the temperature of the side wall and the wind or speed tending to lower the temperature of a side wall.

When the railway car is placed in standby operation and heating is necessary only to prevent freezing of the liquids in the car and also to permit it to be warmed to operating temperature without too much delay, manual switch 108 is operated to its other set of contacts. As before noted, instead of manually operating this switch it can be operated by connecting to the train air line so that it assumes this other position whenever the pressure is decreased in the train air line, as when the train is on a siding. When the switch 108 is shifted to its other position, as noted, it will be seen that the circuits energizing sequence switch 107 and amplifier 106, through switch blades 123 and 125, are opened due to the disengagement of the said switch blades with their contacts. At the same time, thermostat 175 is placed in control of floor heat means 12 and 13 and motor driven valve means 141 is driven closed. Tracing the circuits, it is noted that the amplifier phase winding 151 of motor means 149 is now energized from phase shifting transformer 179 by the circuit: terminal 187 of secondary winding 186, wire 245, wire 246, contact 129, switch blade 127, wire 232, winding 151, wire 233, wire 224, switch blade 117, contact 119, wire 247, and center tap 189 of the said transformer secondary winding. When energized in this manner, motor means 149 is driven in a direction to close valve 144 and thereby stop the overhead heat.

It was previously noted that the circulators of the floor heat means and blower means 137 were preferably controlled in conjunction with manual switch 108 hence it may be assumed that they have been deenergized and are not now operating. However, the supply of heat to the floor heat means can be controlled by circuits, starting with the center tap 189 of transformer winding 186, as follows: tap 189, wire 247, contact 119, switch blade 117, wire 224, wire 223, winding 51, wire 222, switch blade 120, contact 122, wire 248, wire 250, bimetal 176, and either contact 177 or contact 178. Contact 177 is connected to terminal 188 of transformer secondary 186 by the wire 251 and contact 178 is connected to terminal 187 of the secondary winding by wires 252 and 245. Assuming that the temperature affecting bimetal 176 is above the predetermined control point, such as 60°, the bimetal portion would be operated against contact 178 completing the circuit through wires 252 and 245 to terminal 189 of transformer 179, thereby energizing motor means 49 by the same portion of the transformer which drove motor means 149 in a closed direction. This would likewise result in driving motor means 49 in a direction to close valve 44 and thus diminish the heat at floor heat means 13.

Floor heat means 12 is controlled in the same manner by the circuit: center tap 189, wire 247, contact 119, switch blade 117, wire 224, wire 241, winding 41, wire 240, switch blade 114, contact 116, wire 253, wire 250, bimetal 176, contact 178, wire 252, wire 245 and terminal 187 of secondary winding 186. Since the current furnished winding 41 of motor means 39 is of the same phase as that furnished winding 51 of motor means 49, it is obvious that motor means 39 will also be driven in a valve closing direction due to the excessive temperature affecting bimetal 176.

However, should the temperature at 176 drop below the aforementioned 60°, the above circuits are completed from bimetal 176 through contact 177 and wire 251 to terminal 188 of phase shifting transformer 179. Due to the characteristics of transformers of this sort, it will be noted that the output current is now of reverse phase to that previously supplied to motor windings 41 and 51, hence motor means 39 and 49 will be driven in a valve opening direction to supply more heat. Since there is no means to limit the temperature that can be attained by floor heat means 12 and 13 when controlled from thermostat 175, the said floor heat means will tend to operate at their maximum temperature until the heat demands of the car are satisfied. Obviously, when switch 108 is shifted to the position shown, thereby placing the system under normal control again, the high temperatures existing in floor heat means 12 and 13 will cause unbalance of the respective networks sufficiently to prevent any further addition of heat until the said floor heat means have cooled to the desired temperature.

It will thus be noted that in addition to properly controlling the temperature of the car under normal conditions, the present system is readily adapted to standby control operation with a minimum of apparatus being used for such operation.

While the present system has been disclosed as particularly useful for railway cars, it may also be used in homes, as will be more specifically disclosed in the following modification which is shown in Figure 5 of the drawing.

Figure 5

In this figure, the present invention is shown applied to a residence heated by a modified forced air system. It should be kept in mind that this is but one of many modifications that may be used, including a steam heating system for heating a home in the same manner as the aforementioned railway car, or the use of a hot water boiler for heating radiators directly and heating a forced air system indirectly.

In the present system, a forced air furnace 310 supplies heated air to a plenum 311 from which a riser duct 312 delivers air to space 313. The flow of heated air through duct 312 is controlled by a damper means 314 which is adjusted by a proportioning motor means 315 acting through a suitable linkage. Proportioning motor means 315 is controlled by a suitable proportioning room thermostat 316. Motor means 315 and controller 316 are well known in the art and are fully described in Taylor Patent No. 2,028,110. Return air from the room is taken by duct 317 to main return air duct 318 and forced by motor driven blower 319 into furnace 310.

In addition to heating the air delivered to the said furnace, furnace 310 also includes a pipe coil 320 for heating water in a storage tank 321, said coil 320 being connected to tank 321 by an upper pipe 322 and a lower pipe 323. Baseboard radiators 324 and 325, located along the outer walls of space 313, are supplied with heated water from tank 321 through supply pipe 326, three-way valve means 327, supply pipe 328, and pipes 329 and 330, respectively. The water is returned from radiators 324 and 325 through pipes 332, 333, 334, return riser 335, circulator 336 and pipe 337. A by-pass pipe 338 is connected between return pipe 337 and three-way valve 327.

By operation of three-way valve 327, the temperature of the water delivered to radiators 324 and 325 can be varied from that of the return water to the temperature of the water in tank 321 and depends upon the position of member 339 of the said three-way valve. In the position shown, all of the water supplied to the radiators is furnished through by-pass 338 and none is furnished from tank 321, the water supplied thus being at return water temperature. Valve member 339 is adjusted by a proportioning motor 340, similar to motor 315 and therefore similar to that described in the aforementioned Taylor patent. Control is exercised over motor 340 by device 341 which includes a bulb 342 responding to the temperature of the water supplied to radiators 324 and 325 and bulb 343 responding to outdoor temperature, bulbs 342 and 343 being connected to bellows 344 by suitable capillary tubes. Bellows 344 operates potentiometer wiper 345 across resistor 346 to control motor means 340 in the manner described in the aforementioned patent.

Furnace 310 may be heated in any conventional manner such as by an oil burner 347 controlled by device 348. Device 348 includes a bonnet temperature responsive bulb 349 and an outdoor temperature responsive bulb 350 connected by suitable capillary tubes to bellows 351. Bellows 351 operates mercury switch means 352 in a manner to close the switch contacts 353 and 354 when the joint pressure caused by bulbs 349 and 350 is relatively low and to open the contacts when the said pressure is relatively high. In effect, device 348 attempts to maintain a predetermined bonnet temperature for each outdoor temperature with the bonnet temperature being varied upwardly as the outdoor temperature varies downwardly. Device 348 is preferably adjusted to cause the air for space 313 to be heated to a somewhat higher temperature than is needed to meet the demands of the said space. The ultimate control of the heat added to the said space is then effected by damper 314 which limits the volume of air delivered to the space in response to the temperature at thermostat 316.

In this modification, as in the previous example, base-board radiators 324 and 325, analogous to floor heat means 12 and 13 in the previous example, are heated only sufficiently to maintain the mean radiant temperature within the space substantially constant. In this modification, as before, the temperature of the radiator is adjusted upwardly by device 341 as the outdoor temperature falls but at no time are radiators 324 and 325 operated at a sufficiently high temperature to carry more than a lesser portion of the heat load of the space 313. In this manner, there is no overshooting of temperature due to the floor heat means and effective control can be maintained by thermostat 316.

Operation of Figure 5

To make this modification more clear, its operation under a typical set of conditions will now be outlined. With line wires 380 and 381 energized, motor driven circulator 336 is energized by the circuit: line wire 380, wire 382, circulator 336, wire 383 and line wire 381. In addition, motor 356 of blower 319 is energized by the circuit: line wire 380, wire 384, wire 355, motor 356, wire 357, wire 358 and line wire 381. The circuit for oil burner 349 is: line wire 380, wire 384, wire 359, wire 360, oil burner 347, wire 361, switch contact 354, contact 353, wire 362, wire 363, wire 358 and line wire 381. Motor means 340 and 315 are energized through a transformer 365 wherein primary winding 366 is energized by the circuit: line wire 380, wire 384, wire 359, wire 367, winding 366, wire 368, wire 363, wire 358 and line wire 381. Secondary winding 369 is connected to motor means 340 by wires 370 and 371 and to motor means 315 by wires 372 and 373.

With the apparatus energized as above described, it is noted that circulator 336 is operating, blower means 319 is operating, oil burner 347 is not operating, valve means 339 is in a position to by-pass all liquid, and damper means 314 is in a position to restrict the flow of air through duct 312.

Assuming that device 348 will maintain a bonnet temperature of 200° at a design temperature of −35°, and will maintain a bonnet temperature of 100° at an outdoor temperature of 65°, it will be noted that the bonnet temperature is increased 1° for each degree decrease in outdoor temperature. Baseboard radiator means 324 and 325 may be maintained at a temperature, or rather the water supplied to them may be at a temperature varying from 80° to 130° as the outdoor temperature varies from 65° to a −35°, or for each degree change downwardly in outdoor temperature, the liquid temperature is raised ½°. To accomplish this, the capacity of bulb 342 is made twice that of bulb 343. Assuming that the outdoor temperature is 15° above zero, then it appears that a bonnet temperature of 150° is called for, and a base-board temperature of 105° is required. The area of base-board radiators 324 and 325 is such, and the temperature at which they operate is so adjusted that sufficient heat is added by them to maintain the walls, especially the lower portion of the walls, and the floor at such temperatures that the mean radiant temperature in the space 313 remains substantially constant under varying conditions.

With valve member 339 at its extreme by-pass position, it appears that either the liquid temperature at bulb 342 or the outdoor temperature at bulb 343 is relatively high and the pressure in bellows 344 has resulted in wiper 345 being driven to the bottom of resistor 346 thus causing motor means 340 to drive the said valve member to the position shown. In this position, as before noted, all of the water circulated through the system flows through by-pass 338 and none of it goes through tank 321, hence no heat is being added to radiators 324 and 325 from tank 321. In addition, it is noted that either the bonnet temperature at bulb 349 is over the above mentioned 150°, or the outdoor temperature at bulb 350 is over 15°, or both, and therefore the pressure in bellows 351 is relatively high and contacts 353 and 354 are open. The space temperature is apparently near its control point for thermostat 316 is shown at an intermediate point on resistor 374 and damper means 314 is accordingly adjusted to an intermediate value.

Assuming that the outdoor temperature now drops several degrees, the pressure generated by bulb 350 will be decreased, the pressure on bellows 351 will be decreased and switch means 352 will be tilted in a direction to close contacts 353 and 354. This will cause oil burner 347 to be energized by the aforementioned circuit and operate to increase the bonnet temperature. When the bonnet temperature rises to a new and higher value, the added pressure generated by bulb 349 will again cause opening of switch 352 in an obvious manner. The decrease in outdoor temperature will also cause a reduction in pressure at bulb 343 and thereby cause a retraction of bellows 344. This will move wiper 345 upwardly across resistor 346 and cause motor means 340 to move valve member 339 in a direction to restrict the flow of liquid through by-pass 338 and increase the flow through tank 321 and supply pipe 326. This will tend to increase the temperature of liquid flowing through pipe 328 to baseboard radiators 324 and 325 and will cause an increase in pressure at 342 to counteract the decrease in pressure at bulb 343. When the increase in pressure exerted by bulb 342, due to the increased water temperature, is sufficient to offset the decrease in pressure due the lower temperature at bulb 343 so that further movement of bellows 344 is prevented, motor means 340 will be stabilized and valve member 339 will remain in the adjusted position until a further change takes place.

In the event of a temperature rise outdoors, the opposite controlling action takes place. The increase in temperature at bulb 350 causes switch means 352 to remain in a contact open position and thereby prevent further operation of burner means 347 until the bonnet temperature drops sufficiently that the pressure generated by bulb 349 is decreased an amount sufficient to offset the increase in pressure at bulb 350 before the switch means can again be closed. Similarly, an increase in pressure at bulb 343 due to a rising outdoor temperature tends to increase the pressure in bellows 344 thus driving wiper 345 to the position shown wherein valve member 339 is adjusted to a by-pass position so that the liquid temperature at bulb 342 will gradually drop due to heat loss through radiator 324 and 325 and no heat being added from tank 321, until the rise in temperature at 343 is offset by the decrease in temperature at 342.

From the above disclosure, it is seen that the present invention may comprise a steam, forced air, or hot water heating system and is of a sort readily adapted for use in old structures as well as new. In addition, by providing sufficient heat near the walls and floor to maintain the mean radiant temperature substantially constant, comfort can be achieved by maintaining a relatively constant air temperature in the space. This results in a more satisfactory heating system from the standpoint of the occupants and, for the results accomplished, a simplified control system.

The present disclosure is intended to be illustrative only and subject to many substitutions and equivalents hence the scope of the present invention is to be determined only by the appended claims.

We claim as our invention:

1. In a railway car, in combination, individual floor heat means arranged along each side and near the floor of the car, each of said floor heat means comprising a closed loop containing a suitable heat exchange liquid, means for circulating the liquid in each of said loops, individual steam heating means for heating the liquid in each of said loops, valve means for controlling each of said steam heating means, individual means for controlling each of said valve means, each of said individual means including means responsive to the liquid temperature of a floor heat means and means responsive to the outer wall temperature on the respective side of the car, each of the said individual controlling means operating to maintain a predetermined liquid temperature for each outer wall temperature with higher liquid temperatures being required as the outer wall temperatures decrease, means responsive to car temperature for also controlling said valve means when the said car is in standby service, overhead heating means including circulating means for supplying heated air to said car, and means responsive to car air temperature for controlling the said overhead heating system, the said overhead heating system being designed and arranged to provide the major portion of the heat demands of the car and the floor heat system being designed and controlled to furnish a lesser fraction of the total heat needed by the said car.

2. In a railway car heating system, overhead heating means for supplying the major portion of the heat demand of the said car, means responsive to car temperature for controlling said heating means, floor heat means along each side of said car, means for changing the temperature of each of said floor heat means, and means for proportionally controlling said temperature changing means comprising apparatus jointly responsive to the temperature of each of said floor heat means and to the outer wall temperature on each side of the car so that the temperature of each of the said floor heat means may be varied inversely as the temperature of the respective outer wall varies.

3. In apparatus for heating a space, heating plant means for heating both a liquid and air, means for circulating the heated air to said space, means responsive to space temperature for controlling the circulating of said air, means responsive to the temperature of the air circulating through the said heating plant and means responsive to outdoor temperature for jointly controlling said heating plant, floor heat means along substantially the full length of at least one of the walls of said space, a liquid storage tank, means connecting said tank to the liquid heating means of said heating plant, means circulating a liquid through said tank and said floor heat means, a by-pass connection around said tank, mixing valve means for controlling the relative flows through said by-pass means and the said tank and thereby controlling the temperature of the liquid supplied to said floor heat means, means responsive to the temperature of the liquid in said floor heat means, and additional means responsive to outdoor temperature, the said floor heat temperature responsive means and said additional temperature responsive means coacting to jointly and proportionally control said mixing valve.

4. In heating apparatus for an enclosed space, in combination, air heating means for said space, means responsive to space temperature for controlling said air heating means, radiant heat means for radiating heat within said space, said radiating means comprising a closed loop conduit containing a liquid, means for heating the said liquid, means for circulating the liquid, and means for controlling the liquid heating means including means responsive to the liquid temperature and to outdoor temperature arranged to vary the liquid temperature inversely proportional to outdoor temperature.

5. In heating apparatus for a space, in combination, a closed loop conduit means for containing a liquid, said conduit means including elongated horizontal portions relatively close together, means for heating the liquid within said conduit, means for circulating the said liquid, means for controlling said liquid heating means, and means for regulating said controlling means including means responsive to the liquid temperature and to a temperature indicative of outdoor temperature arranged to vary the liquid temperature inversely proportional to the outdoor temperature.

6. In heating apparatus for an enclosed space having an outside wall, in combination, air heating means for said space, means responsive to space temperature for controlling said air heating means, radiant heat means for radiating heat within said space, said radiating means comprising liquid conduit means extending along substantially the full length of said outside wall and being part of a closed liquid circulating system, means for heating the liquid in said circulating system, means for circulating the liquid, and means for controlling the liquid heating means including means responsive to the liquid temperature and to outdoor temperature arranged to vary the liquid temperature inversely proportional to outdoor temperature.

VERNON D. WISSMILLER.
ROBERT A. BEVERIDGE.

REFERENCES CITED

The following references are of record in the file of this patent:

UNITED STATES PATENTS

| Number | Name | Date |
|---|---|---|
| 306,707 | Wheat et al. | Oct. 14, 1884 |
| 2,065,481 | Thulman | Dec. 22, 1936 |
| 2,182,449 | Parks et al. | Dec. 5, 1939 |
| 2,257,471 | McGrath | Sept. 30, 1941 |
| 2,282,441 | Whitlock | May 12, 1942 |
| 2,282,442 | Whitlock | May 12, 1942 |
| 2,307,723 | Anderson | Jan. 5, 1943 |
| 2,319,315 | Garvey | May 18, 1943 |
| 2,346,592 | Lehane et al. | Apr. 11, 1944 |
| 2,404,596 | Roche | July 23, 1946 |
| 2,404,597 | McClain | July 23, 1946 |
| 2,431,790 | Crosthwait | Dec. 2, 1947 |
| 2,451,566 | Lehane et al. | Oct. 19, 1948 |